United States Patent
Zhang

(10) Patent No.: US 10,841,475 B2
(45) Date of Patent: Nov. 17, 2020

(54) CAMERA ASSEMBLY AND ELECTRONIC DEVICE

(71) Applicant: GUANGDONG OPPO MOBILE TELECOMMUNICATIONS CORP., LTD., Guangdong (CN)

(72) Inventor: Xiang Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 85 days.

(21) Appl. No.: 16/200,907

(22) Filed: Nov. 27, 2018

(65) Prior Publication Data

US 2019/0230265 A1 Jul. 25, 2019

(30) Foreign Application Priority Data

Jan. 24, 2018 (CN) .......................... 2018 1 0069674

(51) Int. Cl.
*H04N 5/225* (2006.01)
*H04M 1/02* (2006.01)
*G06F 1/16* (2006.01)

(52) U.S. Cl.
CPC ......... *H04N 5/2257* (2013.01); *G06F 1/1686* (2013.01); *H04M 1/0237* (2013.01);
(Continued)

(58) Field of Classification Search
CPC .. H04N 5/2257; H04N 5/2252; H04N 5/2253; G06F 1/1686; H04M 1/0237; H04M 1/0264
See application file for complete search history.

(56) References Cited

U.S. PATENT DOCUMENTS

2007/0177279 A1* 8/2007 Cho ...................... G02B 7/102
359/692
2008/0024627 A1 1/2008 Nozawa
2008/0198262 A1 8/2008 Kuo et al.

FOREIGN PATENT DOCUMENTS

CN 2829242 Y 10/2006
CN 2836369 Y 11/2006
(Continued)

OTHER PUBLICATIONS

First Office Action from China patent office in a counterpart Chinese Patent application No. 201810069674.5, dated Nov. 22, 2019 (8 page).
(Continued)

*Primary Examiner* — Twyler L Haskins
*Assistant Examiner* — Fayez Bhuiyan

(57) ABSTRACT

The present disclosure provides a camera assembly and an electronic device. The camera assembly and the electronic device may both include a first plate, a second plate, a first electromagnetic component, a second electromagnetic component and an elastic component. The elastic component is connected between the second plate and the second electromagnetic component. The first electromagnetic component may be configured to generate or eliminate electromagnetic force between the first electromagnetic component and the first plate. The second electromagnetic component may be configured to generate or eliminate electromagnetic force between the second electromagnetic component and the second plate. The camera module may be driven to move under the generation or elimination of the electromagnetic force and the elastic force of the elastic component. Thus, the adaptability of the camera assembly may be improved.

16 Claims, 5 Drawing Sheets

(52) U.S. Cl.
CPC ........ *H04M 1/0264* (2013.01); *H04N 5/2252* (2013.01); *H04N 5/2253* (2013.01)

(56) References Cited

FOREIGN PATENT DOCUMENTS

| | | |
|---|---|---|
| CN | 101236353 A | 8/2008 |
| CN | 102447827 A | 5/2012 |
| CN | 103595836 A | 2/2014 |
| CN | 203661120 U | 6/2014 |
| CN | 104023190 A | 9/2014 |
| CN | 203827399 U | 9/2014 |
| CN | 104333624 A | 2/2015 |
| CN | 105049556 A | 11/2015 |
| CN | 105376463 A | 3/2016 |
| CN | 106850896 A | 6/2017 |
| CN | 107197133 A | 9/2017 |
| CN | 107426480 A | 12/2017 |
| EP | 3373562 A1 | 9/2018 |
| JP | 2005-106850 A | 4/2005 |
| JP | 2005223634 A | 8/2005 |
| WO | WO2006041443 A1 | 4/2006 |

OTHER PUBLICATIONS

European search report, EP18208537 dated May 22, 2019.
The International Search Report and Written Opinion dated Feb. 25, 2019; PCT/CN2018/117495.
Indian examination report, 201814046224, dated Aug. 18, 2020 (6 pages).

\* cited by examiner

U.S. 10,841,475 B2

CAMERA ASSEMBLY AND ELECTRONIC DEVICE

CROSS-REFERENCE TO RELATED APPLICATIONS

The present application claims foreign priority of Chinese Patent Application No. 201810069674.5, filed on Jan. 24, 2018 in the State Intellectual Property Office of China, the entire contents of which are hereby incorporated by reference.

TECHNICAL FIELD

The present disclosure relates to electronic devices, and in particular to a camera assembly and an electronic device.

BACKGROUND

As the development of the communication technology, electronic devices such as mobile phones, laptops are more and more frequently used in daily life.

The camera is a main electronic component of the electronic device, and is used for photographing. In related art, a camera is generally fixed inside the electronic device, and does not have good adaptability. Thus, it is necessary to provide a solution to improve the adaptability of the camera.

BRIEF DESCRIPTION OF THE DRAWINGS

To better describe the technical solution of this application, a brief description of all the drawings used in this application will be provided as below. Clearly these drawings below are only examples for this application. For those skilled in the art, other drawings can be obtained based on the ones below easily without much of the creative work.

FIG. is a schematic structural view of an electronic device according to an embodiment of the present disclosure.

DETAILED DESCRIPTION

Figure 1:
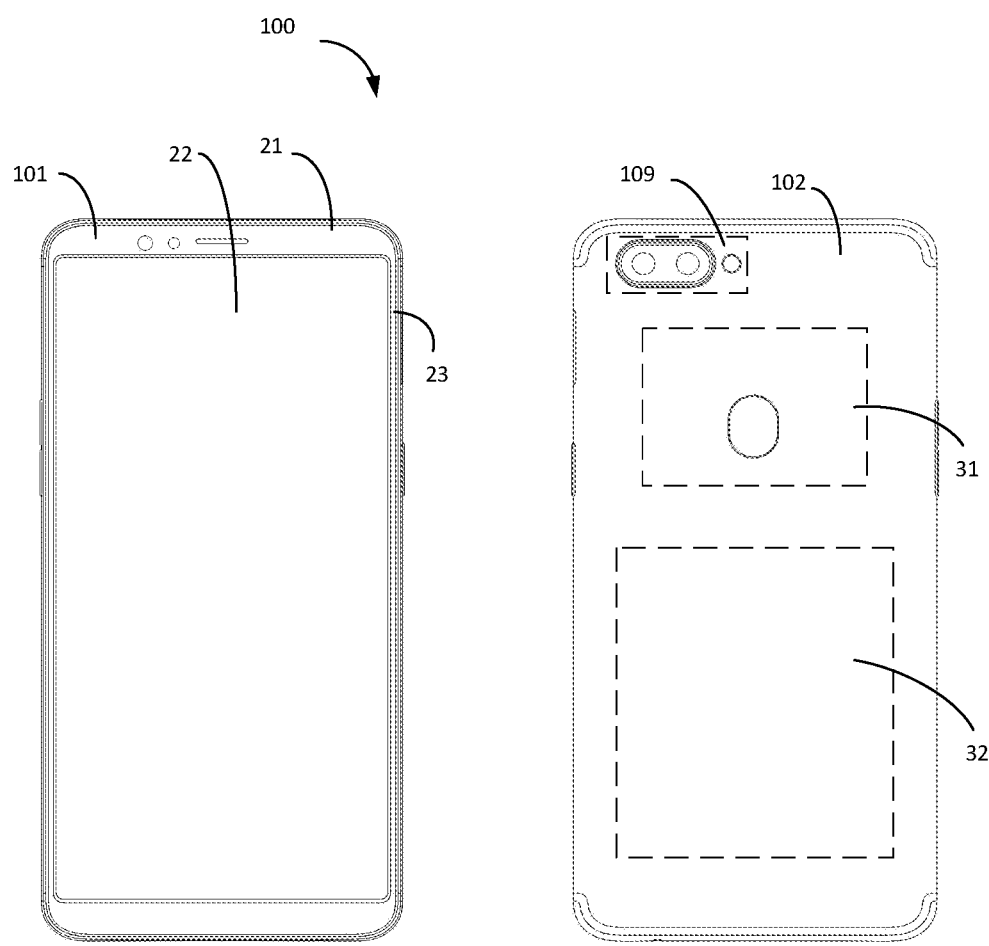

Technical solutions in embodiments of the present disclosure are hereinafter described clearly with reference to accompanying drawings in embodiments of the present disclosure. Apparently, embodiments described are a part of embodiments of the present disclosure, but not all embodiments. All other embodiments obtained by those skilled in the art based on the embodiments in the present disclosure without creative labor are within the protection scope of the present disclosure.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise" and "counterclockwise" should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, terms "mounted", "connected", "coupled" and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

FIG. 1 illustrates an electronic device 100 according to an embodiment of the present disclosure.

The electronic device 100 may include a front case 101 and a back case 102. The front case 101 may be utilized to protect the cover plate 21, the display screen 22 and the like. The front case 101 and the back case 102 may cooperatively define an accommodating space for receiving other components such as a camera assembly 109, a circuit board 31 and a battery 32.

In some embodiments, the front case 101 and the back case 102 may be metal cases. It should be noted that, the material of the front case 101 and the back case 102 is not limited herein. For example, the front case 101 and the back case 102 may include both a plastic portion and a metal portion. Alternatively, the front case 101 and the back case 102 may be plastic cases.

The cover plate 21 may be made of glass, sapphire, plastic, etc., and may be utilized to protect the display screen 22. The cover plate 21 may prevent dust, water or oil from adhering to the display screen 22, and prevent the display screen 22 from corrosion in external environment and from damage due to external impact.

The cover plate 21 may include a display portion and a non-display portion. The display portion is transparent and corresponds (时态) to the light-emitting surface of the display screen 22. The non-display portion may be opaque, which can shield the inner structure of the electronic device 100. Within the non-display portion there may be formed open holes for transmitting sound or light.

It should be understood that, the electronic device 100 may have a bezel-less structure, where the non-display portion is not arranged.

Figure 2:
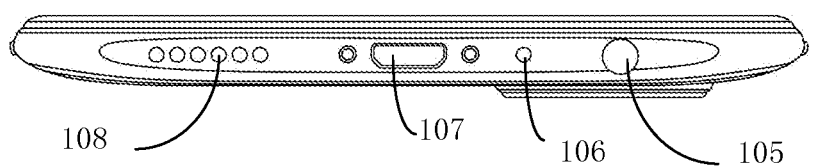
FIG. 2 is a side view of an electronic device according to an embodiment of the present disclosure.

Referring to FIG. 2, the electronic device 100 may define on its outer edge a headphone hole 105, a microphone hole 106, a USB hole 107 and a loudspeaker hole 108. The headphone hole 105, the microphone hole 106, the USB hole 107 and the loudspeaker hole 108 may be through holes.

Figure 3:
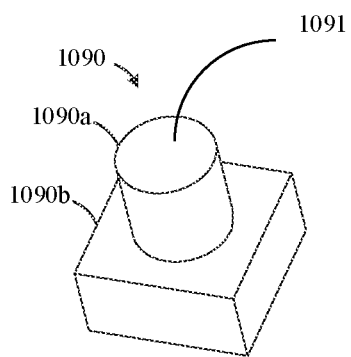
FIG. 3 is a perspective view of a camera module according to an embodiment of the present disclosure.
Figure 4:
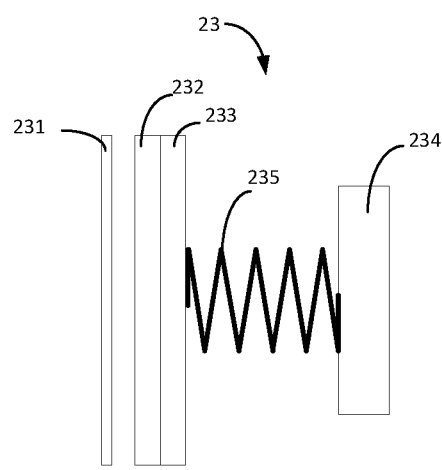
FIG. 4 is a schematic structural view of a driving device according to an embodiment of the present disclosure.

Referring to FIGS. 3-4, the camera assembly 109 may include a camera module 1090 and a driving device 23.

As shown in FIG. 3, the camera module 1090 may include a lens 1090a and a chassis 1090b. The lens 1090a may have a photographing surface 1091. The lens 1090a may be installed on the chassis 1090b. In some embodiments, the camera module 1090 may be further integrated with a flash or a sound receiver on the chassis 1090b. In some embodiments, the camera module 1090 may include two lenses on a same chassis.

As shown in FIG. 4, the driving device 23 may include a first plate 231, a first electromagnetic component 232, a second electromagnetic component 233, a second plate 234 and an elastic component 235.

On the first plate 231 may be installed the camera module 1090.

In some embodiments, the first plate 231 may be made of magnetic metal such as iron, cobalt, nickel, or some of the seventh group of elements.

The first electromagnetic component 232 may face towards the first plate 231. The first electromagnetic component 232 may be utilized to generate or eliminate electromagnetic force between the first electromagnetic component 232 and the first plate 231.

In some embodiments, when the first electromagnetic component 232 is enabled, electromagnetic force may be generated between the first electromagnetic component 232 and the first plate 231 such that the first plate 231 may be fixed with the first electromagnetic component 232 by the electromagnetic force. In this circumstance, the camera module 1090 installed on the first plate 231 may follow the movement of the first plate 231. That is, there may exist a co-movement among the camera module 1090, the first plate 231 and the first electromagnetic component 232 in this situation. In other embodiments, when the first electromagnetic component 232 is disabled, electromagnetic force may be eliminated between the first electromagnetic component 232 and the first plate 231 such that the first plate 231 may be separated from the first electromagnetic component 232. In this circumstance, the camera module 1090 installed on the first plate 231 and the first plate 231 itself may be separated from the first electromagnetic component 232. That is, there does not exist a co-movement among the camera module 1090, the first plate 231 and the first electromagnetic component 232 in this situation, and the camera module 1090 may have another motion mode such as being rotated by a motor. Therefore, the camera module 1090 may switch between two motion modes without interruption.

In some embodiments, the first electromagnetic component 232 may be a coil. The coil may generate electromagnetic field when enabled. In this circumstance, the first electromagnetic component 232 may attract the first plate 231. That is, the first plate 231 may be fixed with the first electromagnetic component 232 by the electromagnetic force. When the coil is disabled, the electromagnetic field generated by the coil may be eliminated. In this circumstance, the attraction force of the first electromagnetic component 232 to the first plate 231 may be eliminated. That is, the first plate 231 may be separated from the first electromagnetic component 232.

The second plate 234 may be installed inside a case 100a. In one embodiment, the second plate 234 may be fixed to a middle frame, a front case 101, the back case 102 or other fixed components of the electronic device 100.

In some embodiments, the second plate 234 may be made of magnetic metal such as iron, cobalt, nickel, or some of the seventh group of elements.

The second electromagnetic component 233 may be connected on a side of the first electromagnetic component 232 far away from the first plate 231. In this way, the acting surfaces of the first electromagnetic component 232 and the second electromagnetic component 233 may be opposite to each other. That is, the acting surface of the first electromagnetic component 232 may face towards the first plate 231 while the acting surface of the second electromagnetic component 233 may face towards the second plate 234. Thus, interruption between the first electromagnetic component 232 and the second electromagnetic component 233 may be reduced such that the movement of the first plate 231 driven by the first electromagnetic component 232 and the movement of the second plate 234 driven by the second electromagnetic component 232 may be controlled independently. The second electromagnetic component 233 may be utilized to generate or eliminate electromagnetic force between the second electromagnetic component 233 and the second plate 234.

In some embodiments, when the second electromagnetic component 233 is enabled, electromagnetic force may be generated between the second electromagnetic component 233 and the second plate 234 such that the second electromagnetic component 233 may move towards the second plate 234. That is, the second electromagnetic component 233 may be fixed with the second plate 234 by the electromagnetic force. In other embodiments, when the second electromagnetic component 233 is disabled, the electromagnetic force between the second electromagnetic component 233 and the second plate 234 may be eliminated. That is, the second plate 234 may be separated from the second electromagnetic component 233.

In some embodiments, the second electromagnetic component 233 may be a coil. The coil may generate electromagnetic field when enabled. In this circumstance, the second electromagnetic component 233 may attract the second plate 234. That is, the second plate 234 may be fixed with the second electromagnetic component 233 by electromagnetic force. When the coil is disabled, the electromagnetic field generated by the coil may be eliminated. In this circumstance, the attraction force of the second electromagnetic component 233 to the second plate 234 may be eliminated. That is, the second plate 234 may be separated from the second electromagnetic component 233.

The elastic component 235 may be connected between the second plate 234 and the second electromagnetic component 233.

When the second electromagnetic component 233 is enabled, electromagnetic force may be generated between the second electromagnetic component 233 and the second plate 234. The electromagnetic force may drive the first plate 231, the first electromagnetic component 232 and the second electromagnetic component 233 to move towards the second plate 234 such that the camera module 1090 may be pulled back by the driving device 23. At the same time, the elastic component 235 may elastically deform and change into a compressed state. Furthermore, when the camera module 1090 is being pulled back, the electromagnetic force between the second electromagnetic component 233 and the second plate 234 and the elastic force generated by the elastic component 235 may both exist, and their directions may be opposite. Thus, when the second electromagnetic component 233 together with the first electromagnetic component 232, the first plate 231 and the camera module 1090 moves towards the second plate 234, the elastic component 235 may act as a cushion which may reduce the vibration of the camera module 1090.

When the second electromagnetic component 233 is disabled. The electromagnetic force between the second electromagnetic component 233 and the second plate 234 may be eliminated. In this circumstance, the elastic component 235 may push the first plate 231, the first electromagnetic component 232 and the second electromagnetic component 233 to move away from the second plate 234. That is, the camera module 1090 may be pushed out by the driving device 23. At the same time, the elastic component 235 may elastically deform and change into a free state. Furthermore, the elastic force generated by the elastic component 235 may gradually decrease as the length of the elastic component 235 gradually increase when the camera module 1090 is being pushed out. Thus, when the second electromagnetic component 233 together with the first electromagnetic component 232, the first plate 231 and the camera module 1090 moves away from the second plate 234, the elastic component 235 may act as a cushion which may reduce gradually the movement speed and also reduce the vibration of the camera module 1090.

It should be understood, in other embodiments, the second plate 234 may also be made of magnetic material, or be an electromagnetic. Accordingly, the second electromagnetic component 233 may move relative to the second plate 234 when enabled or disabled. In a first example, when the second electromagnetic component 233 is enabled, electromagnetic repulsive force may be generated between the second electromagnetic component 233 and the second plate 234. The second electromagnetic component 233 together with the first electromagnetic component 232 and the camera module 1090 may be pushed out by the repulsive force. The elastic component 235 may be elongated and generate a tensile force, which may stabilize the movement of the second electromagnetic component 233 and limit the extreme position of the second electromagnetic component 233. Moreover, when the camera module 1090 is to be pulled back, the second electromagnetic component 233 may be disabled. Then the second electromagnetic component 233 together with the first electromagnetic component 232 and the camera module 1090 may be pulled back by the tensile force of the elastic component 235 until the elastic component 235 restores to a free state.

Figure 5:
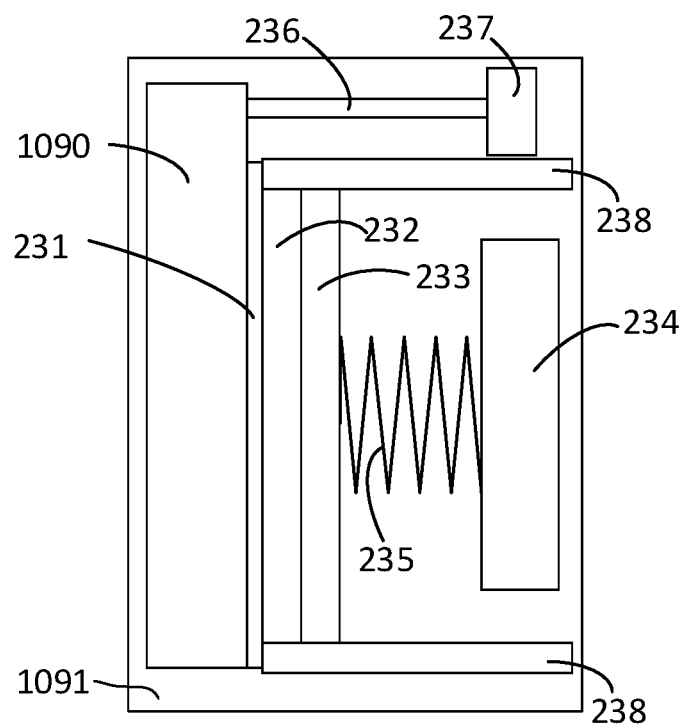
FIG. 5 is a schematic structural view of a camera assembly according to an embodiment of the present disclosure.

Referring to FIG. 5, in some embodiments, the driving device 23 may further include a connecting rod 236 and a motor 237. The connecting rod 236 may be connected between the camera module 1090 and the motor 237, and the connecting rod 236 may be slidably connected to the camera module 1090. The motor 237 may be utilized to drive the connecting rod 236 to rotate so as to drive the camera module 1090 to rotate.

In some embodiments, the second electromagnetic component 233 and the elastic component 235 may drive the camera module 1090 to move along the connecting rod 236, In some embodiments, when the second electromagnetic component 233 is enabled, electromagnetic force may be generated between the second electromagnetic component 233 and the second plate 234. Then the first plate 231, the first electromagnetic component 232 and the second electromagnetic component 233 may move towards the second plate 234 such that the camera module 1090 may also move towards the second plate 234 along the connecting rod 236. In other words, the path along which the camera module 1090 is pulled back may be determined.

In some embodiments, when the second electromagnetic component 233 is disabled. The electromagnetic force between the second electromagnetic component 233 and the second plate 234 may be eliminated. In this circumstance, the elastic component 235 may push the first plate 231, the first electromagnetic component 232 and the second electromagnetic component 233 to move away from the second plate 234 such that the camera module 1090 may also move away from the second plate 234 along the connecting rod 236. In other words, the path along which the camera module 1090 is pushed out may be determined. Thus, the stability of the motion of the camera module 1090 may be improved.

In some embodiments, the driving device may further include a slide rail 238. The first electromagnetic component 232 and the second electromagnetic component 233 may be slidably connected to the slide rail 238. Accordingly, the first electromagnetic component 232 and the second electromagnetic component 233 may be capable of moving along the extending direction of the slide rail 238.

Continuing to refer to FIG. 5, in some embodiments, the camera assembly 109 may further include a housing 1091. The driving device 23 may be installed on the housing 1091. Specifically, the motor 237, the slide rail 238, and the second plate 234 may be fixedly connected to the housing 1091. Thus, the camera assembly 109 may be installed in the electronic device 100 by connecting the housing 1091 to the front case 21, the back case 23 or the middle frame of the electronic device 100. It should be understood, the structure of the housing 1091 shown in FIG. 5 is only for illustrative purpose. The housing 1091 may have various shapes, sizes and configurations based on actual requirement. For example, the housing 1091 may have a semi-box configuration, a plate configuration and the like.

The function of the camera assembly 109 of the electronic device 100 may be described specifically in following embodiments.

Figure 6:
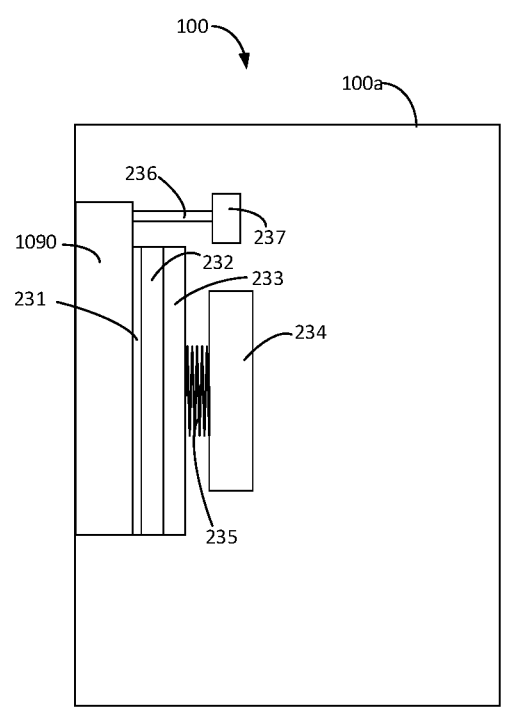
FIG. 6 illustrates a first state of an electronic device during its operation according to an embodiment of the present disclosure.

Referring to FIG. 6, the state where the camera module 1090 and the driving device 23 are both located inside the electronic device 100 may be taken as an initial state.

In the initial state, the first electromagnetic component 232 and the second electromagnetic component 233 may both be in an enabled state. The first plate 231 may be magnetically attracted by the first electromagnetic component 232, the second plate 234 may be magnetically attracted by the second electromagnetic component 233, and the elastic component 235 may be in a compressed state.

Figure 7:
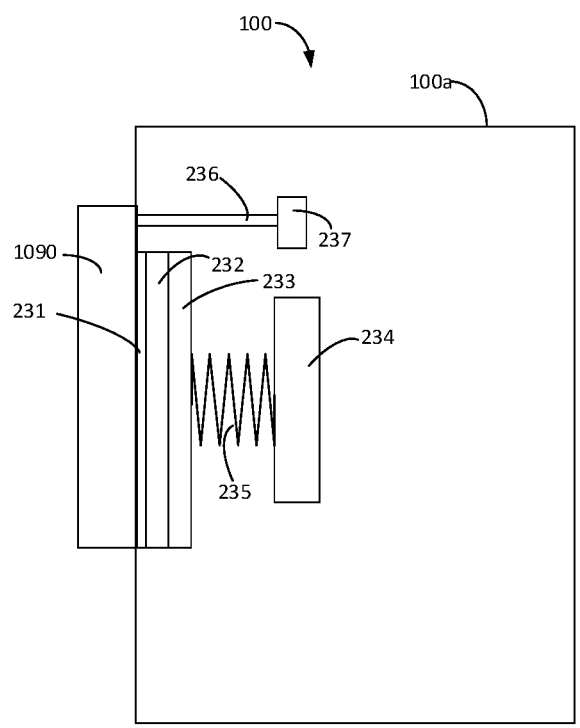
FIG. 7 illustrates a second state of an electronic device during its operation according to an embodiment of the present disclosure.

Referring to FIGS. 6-7, when the second electromagnetic component 233 is disabled, the electromagnetic force between the second plate 234 and the second electromagnetic component 233 may be eliminated. The elastic component 235 may push the first plate 231, the first electromagnetic component 232 and the second electromagnetic component 233 to move away from the second plate 234. Thus, the camera module 1090 inside the case 100a may also be driven to move away from the second plate 234 along the connecting rod 236 and be pushed outside the case 100a. Meanwhile, the first electromagnetic component 232 may still stay in an enabled state, and the first plate 231 may still be fixed with the first electromagnetic component 232 by electromagnetic force therebetween. That is, the camera module 1090 may still move together with the first electromagnetic component 232.

Referring to FIG. 7, when the first electromagnetic component 232 is disabled, the electromagnetic force between the first plate 231 and the first electromagnetic component 232 may be eliminated such that the first plate 231 may be separated from the first electromagnetic component 232. That is, the camera module 1090 does not follow the movement of the first electromagnetic component 232 in this situation.

Figure 8:
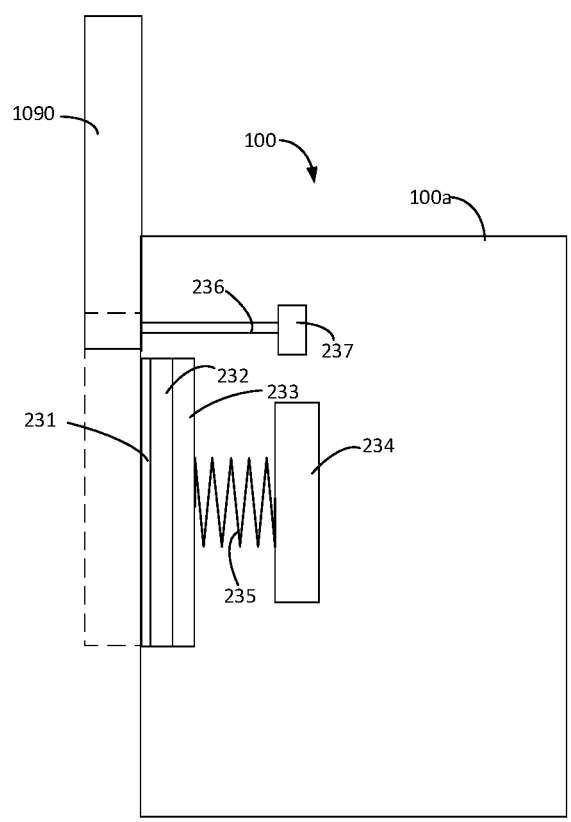
FIG. 8 illustrates a third state of an electronic device during its operation according to an embodiment of the present disclosure.
Figure 9:
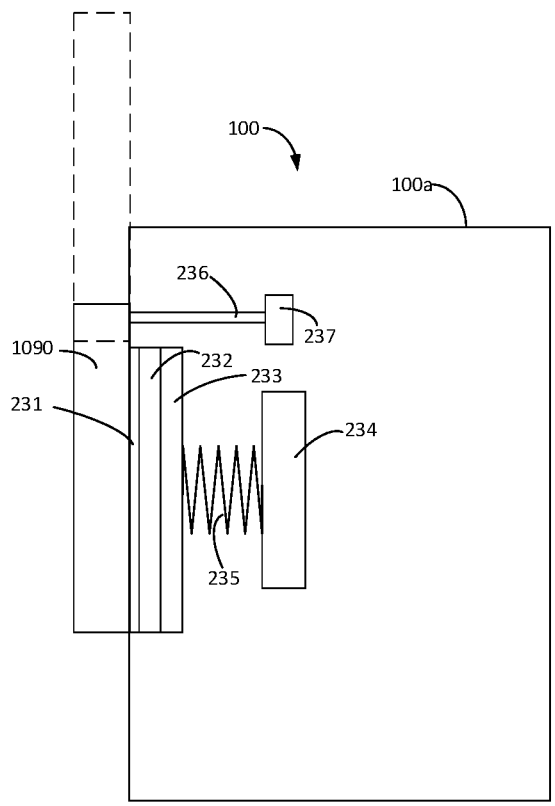
FIG. 9 illustrates a fourth state of an electronic device during its operation according to an embodiment of the present disclosure.

In some embodiments, referring to FIG. 8, the motor 237 may then be powered on. The motor 237 may drive the connecting rod 236 to rotate so as to drive the camera module 1090 to rotate to a required position for photographing. After completion of photographing, referring to FIG. 9, the motor 237 may be started again. The motor 237 may drive the connecting rod 236 to rotate so as to drive the camera module 1090 to rotate to a position corresponding to the location of the first electromagnetic component 232.

Referring again to FIG. 7, the first electromagnetic component 232 may be enabled again. Accordingly, electromagnetic force may be generated between the first plate 231 and the first electromagnetic component 232. In this situation, the second plate 234 may be fixed with the second electromagnetic component 233 by the electromagnetic force, and the camera module 1090 may move together with the first electromagnetic component 232 again.

Finally, referring to FIGS. 6-7, the second electromagnetic component 233 may be enabled again. Accordingly, electromagnetic attraction may be generated between the second electromagnetic component 233 and the second plate 234 such that the first plate 231, the first electromagnetic component 232 and the second electromagnetic component 233 may be driven to move towards the second plate 234. Correspondingly, the elastic component 235 may elastically deform and change back into the compressed state. The camera module 1090 may be pulled back inside the electronic device 100 and the driving device 23 may return to the initial state.

In some embodiments, the second plate 234, the motor 237 and the slide rail 238 of the camera assembly may be fixed to a frame of the electronic device 100. For example, the frame may include the front case 101 and the back case 102 of the electronic device 100. It should be understood that, the frame may also include a middle frame (not shown) in some embodiments.

In some embodiments, when the back side of the camera module 1090 faces and connects to the first plate 231, the first plate 231 may have a flat plate structure.

Figure 10:
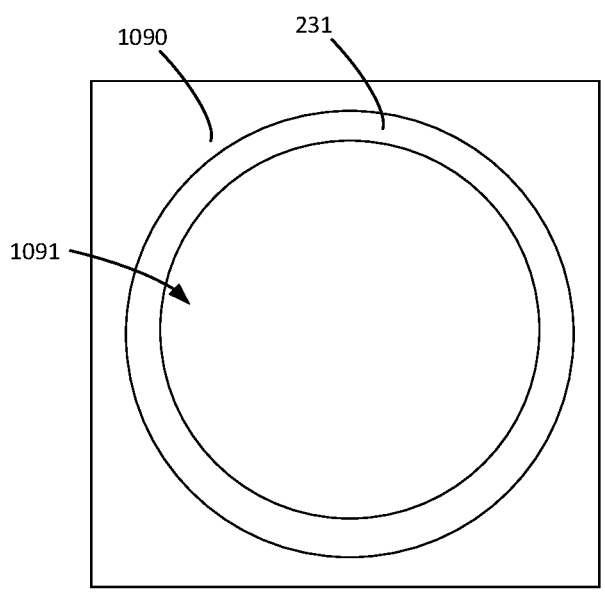
FIG. 10 illustrates a schematic structural view of a camera assembly with a first plate according to an embodiment of the present disclosure.

In some embodiments, referring to FIG. 10, the photographing surface 1091 of the camera module 1090 may face towards the first plate 231 and be fixed to the first plate 231. The first plate 231 may have an annular configuration which surrounds the photographing surface 1091 of the camera module 1090.

For electronic devices of bezel-less type, if a front camera is set at the screen side, the display portion will be occupied. In the present disclosure, the driving device 23 is employed, and the camera module 1090 is installed behind the screen of the electronic device. The photographing surface 1091 of the camera module 1090 may face towards the screen side of the electronic device. Specifically, the photographing surface 1091 of the camera module 1090 may face towards the first plate 231. The first plate 231 may have an annular configuration which surrounds the photographing surface 1091 of the camera module 1090. The driving device 23 may be configured to push the camera module 1090 outside the case 100a of the electronic device. Then the motor 237 may rotate the camera module 1090 to make the photographing surface 1091 of the camera module 1090 to be staggered with the case 100a of the electronic device, which may realize the front camera function. For example, referring also to FIG. 1, the back case 102 may define an opening (not shown) through which the camera module 1090 may be pushed outside or pulled inside the back case 102. The camera module 1090 may be pushed outside the back case 102 of the electronic device 100 by the driving device 23, and then be rotated by the driving device 23 to make its photographing surface 1091 to be located beyond the back case 102 and the front case 101. In this way, the camera module 1090 may be utilized for photographing the front side of the electronic device 100.

It should be understood, in other embodiments, the photographing surface 1091 of the camera module 1090 may be arranged to face towards the lateral side or the back side of the electronic device 100 based on actual design requirement, which is not limited in the present disclosure.

The camera module 1090, the first electromagnetic component 232 and the second electromagnetic component 233 may all be electrically connected to the circuit board 31.

The circuit board 31 may be installed in the electronic device 100. The circuit board 31 may be the main board of the electronic device 100. The circuit board 31 may be integrated with at least one of a motor, a microphone, a loudspeaker, a headphone jack, a USB interface, a camera module 1090, a distance sensor, an environment light sensor, a sound receiver or a processor. The headphone jack may be located corresponding to the location of the headphone hole 105. The microphone may be located corresponding to the location of the microphone hole 106. The USB interface may be located corresponding to the location of the USB hole 107. The loudspeaker may be located corresponding to the location of the loudspeaker hole 108.

In some embodiments, the circuit board 31 may be fixed inside the electronic device 100. Specifically, the circuit board 31 may be fixed to the driving device 23 by screws or clips. It should be noted that the fixation method of the circuit board 31 and the driving device 23 is not limited in the present disclosure, and other method may also be employed. For example, screws and clips may both be utilized at the same time for fixation.

The battery 32 may be installed in the electronic device 100. The battery 32 may be electrically connected to the circuit board 31 so as to supply power to the electronic device 100. The back case 102 may be the battery case of the battery 32. The back case 102 may cover and protect the battery 32. Specifically, the back case 102 may cover and protect the battery 32 from damage due to collision and drop.

According to the present disclosure, the camera assembly and the electronic device may both include a first plate, a second plate, a first electromagnetic component, a second electromagnetic component and an elastic component. The elastic component is connected between the second plate and the second electromagnetic component. The first electromagnetic component may be configured to generate or eliminate electromagnetic force between the first electromagnetic component and the first plate. The second electromagnetic component may be configured to generate or eliminate electromagnetic force between the second electromagnetic component and the second plate. The camera module may be driven to move under the generation or elimination of the electromagnetic force and the elastic force of the elastic component. Thus, the adaptability of the camera assembly may be improved.

The electronic device 100 provided by one embodiment of the present disclosure may include a frame (including the front case 101 and a back case 102), a motor 237, a connecting rod 236, a camera module 109, a first plate 231, a second plate 234, a slide rail 238, a first electromagnetic component 232, a second electromagnetic component 233 and an elastic component 235. The frame may define an accommodating space for receiving other components of the electronic device 100. The motor 237, the second plate 234 and the slide rail 238 may all be fixed to the frame and located in the accommodating space. The connecting rod 236 may be connected to the motor 237. The camera module 109 may be slidably connected to the connecting rod 236. The first plate 231 may be connected to the camera module 109 such that these two components may move simultaneously. The first electromagnetic component 232 may be slidably connected to the slide rail 238 and may face the first plate 231, and be utilized to generate electromagnetic field between the first electromagnetic component 232 and the first plate 231 when enabled. The second electromagnetic component 233 may be slidably connected to the slide rail 238, and be installed on a side of the first electromagnetic component 232 opposite to the first plate 231 to face the second plate 234. The second electromagnetic component 233 may be utilized to generate electromagnetic field between the second electromagnetic component 233 and the second plate 234 when enable. The elastic component 235 may be connected between the second electromagnetic component 233 and the second plate 234.

In one embodiment, the processor of the electronic device 100 may generate or receive a first control indication which indicates the camera module 109 needs to be moved outside the frame for photographing. In response to the first control indication, the second electromagnetic component 233 is disabled such that the second electromagnetic component 233 together with the first electromagnetic component 232 and the first plate 231 is pushed away from the second plate 234 and the camera module 109 is pushed outside the frame by elastic force of the elastic component 235. Then the first electromagnetic component 232 is disabled to release the camera module 109, and the motor 237 is enabled to drive the connecting rod 236 to rotate the camera module 109 from an initial position to a preset position. Specifically, the initial position refers to the position of the camera module 109 in which it can be pulled inside the frame without rotation, and the preset position refers to the position of the camera module 109 in which it can be utilized for photographing. When the camera module 109 is in the preset position, the photographing surface 1091 may be located at the lateral side of the electronic device 100, above the top edge of the electronic device 100 or below the bottom edge of the electronic device 100 according to design requirement, which is not limited in the present disclosure.

In another embodiment, the processor of the electronic device 100 may generate or receive a second control indication which indicates the camera module 109 needs to be moved inside the frame. In response to the second control indication, the motor 237 is enabled to drive the connecting rod 236 to rotate the camera module 109 from the preset position to the initial position. Then the first electromagnetic component 232 is enabled to catch the first plate 231 and the camera module 109 by electromagnetic force. The second electromagnetic 233 is then enabled such that the second electromagnetic component 233 together with the first electromagnetic component 232 and the first plate 231 is pushed towards the second plate 234, and the camera module 109 is pulled inside the frame by electromagnetic force. In this situation, the elastic component 235 is compressed.

The principle of the present disclosure is summarized below: In a first case, the processor of the electronic device 100 may generate or receive a first control indication. In response to the first control indication, the driving device 23 is configured to push the camera module 1090 outside the frame of the electronic device 100, and then release the camera module 1090. Sequentially, the motor 237 is configured to rotate the camera module 1090 from a first angle to a second angle. In a second case, the processor of the electronic device 100 may generate or receive a second control indication. In response to the second control indication, the motor 237 is configured to rotate the camera module 1090 from the second angle to the first angle. Sequentially, the driving device 23 is configured to catch the camera module 1090 again, and then pull in the camera module 1090 inside the frame of the electronic device 100. Therefore, the implementation of the present disclosure may move the camera module to the position where it may operates for photographing, or to the position where it resides inside the electronic device 100. It should be understood, the pushing out and the pulling back of the camera module may be achieved in other ways as compared with the embodiments described above. For example, the driving device 23 may include one or more liquid/air cylinder, motor-gear rack assembly or motor-chain assembly instead of the electromagnetic components 232/233 to achieve the linear movement of the camera module 1090. These equivalents should also be within the scope of the present disclosure.

Embodiments of the camera assembly and the electronic device provided by the present disclosure have been described in detail, and principles and embodiments of the present disclosure have been elaborated with reference to specific examples. However, the description of the above embodiments is merely used to assist in understanding the present disclosure and its core idea. It is conceivable for those skilled in the art to make changes in the specific embodiments and application areas according to the idea of the present disclosure. The description should not be construed to limit the present disclosure.

What is claimed is:

1. A camera assembly adapted to be installed in an electronic device with a frame, comprising:
a camera module; and
a driving device, wherein the driving device comprises:
a first plate connected to the camera module;
a first electromagnetic component facing towards the first plate and configured to generate or eliminate electromagnetic force between the first electromagnetic component and the first plate;
a second plate configured to be fixedly connected to the frame of the electronic device;
a second electromagnetic component connected on a side of the first electromagnetic component far away from the first plate, and configured to generate or eliminate electromagnetic force between the second electromagnetic component and the second plate; and
an elastic component connected between the second plate and the second electromagnetic component;
wherein when the first electromagnetic component is enabled, electromagnetic force is generated between the first electromagnetic component and the first plate, the first plate is fixed with the first electromagnetic component by the electromagnetic force, and the camera module is capable of moving together with the first electromagnetic component;
when the first electromagnetic component is disabled, electromagnetic force is eliminated between the first electromagnetic component and the first plate, and the first plate is separated from the first electromagnetic component;
wherein when the second electromagnetic component is enabled, electromagnetic force is generated between the second electromagnetic component and the second plate, and the second plate is fixed with the second electromagnetic component by the electromagnetic force, and the camera module is pulled inside the frame; and
when the second electromagnetic component is disabled, electromagnetic force is eliminated between the second electromagnetic component and the second plate, and the second plate is separated from the second electromagnetic component, and the camera module is pushed out of the frame.

2. The camera assembly of claim 1, wherein
when the second electromagnetic component is enabled, the elastic component is compressed by the second electromagnetic component.

3. The camera assembly of claim 1, further comprising a connecting rod and a motor, wherein
the connecting rod is connected between the camera module and the motor, and the camera module is slidably connected to the connecting rod;
the motor is configured to drive the connecting rod to rotate the camera module.

4. The camera assembly of claim 1, further comprising:
a slide rail, the first electromagnetic component and the second electromagnetic component are slidably connected to the slide rail such that the first electromagnetic component and the second electromagnetic component are capable of moving along the slide rail.

5. The camera assembly of claim 1, wherein
the first plate has an annular configuration, and surrounds a photographing surface of the camera module.

6. An electronic device, comprising a frame and a camera assembly, wherein the camera assembly comprises:
a camera module; and
a driving device, wherein the driving device comprises:
a first plate connected to the camera module;
a first electromagnetic component facing towards the first plate and configured to generate or eliminate electromagnetic force between the first electromagnetic component and the first plate;
a second plate fixed to the frame;
a second electromagnetic component connected on a side of the first electromagnetic component far away from the first plate, and configured to generate or eliminate electromagnetic force between the second electromagnetic component and the second plate; and
an elastic component connected between the second plate and the second electromagnetic component;
wherein when the first electromagnetic component is enabled, electromagnetic force is generated between the first electromagnetic component and the first plate, the first plate is fixed with the first electromagnetic component by the electromagnetic force, and the camera module is capable of moving together with the first electromagnetic component;
when the first electromagnetic component is disabled, electromagnetic force is eliminated between the first electromagnetic component and the first plate, and the first plate is separated from the first electromagnetic component;
wherein when the second electromagnetic component is enabled, electromagnetic force is generated between the second electromagnetic component and the second plate, and the second plate is fixed with the second electromagnetic component by the electromagnetic force, and the camera module is pulled inside the frame; and
when the second electromagnetic component is disabled, electromagnetic force is eliminated between the second electromagnetic component and the second plate, and the second plate is separated from the second electromagnetic component, and the camera module is pushed out of the frame.

7. The electronic device of claim 6, wherein
when the second electromagnetic component is enabled, the elastic component is compressed by the second electromagnetic component.

8. The electronic device of claim 6, further comprising a connecting rod and a motor, wherein
the connecting rod is connected between the camera module and the motor, and the camera module is slidably connected to the connecting rod;
the motor is fixed to the frame, and is configured to drive the connecting rod to rotate the camera module.

9. The electronic device of claim 8, wherein
the first plate has an annular configuration, and surrounds a photographing surface of the camera module.

10. The electronic device of claim 6, further comprising:
a slide rail fixed to the frame, the first electromagnetic component and the second electromagnetic component are slidably connected to the slide rail such that the first electromagnetic component and the second electromagnetic component are capable of moving along the slide rail.

11. An electronic device, comprising:
a frame defining an accommodating space;
a motor fixed to the frame and located in the accommodating space;
a connecting rod connected to the motor;
a camera module slidably connected to the connecting rod and rotatable between a preset position in which the camera module is able to take picture and an initial position in which the camera module is able to be pulled inside in the frame without rotation;
a slide rail fixed to the frame and located in the accommodating space; and
a driving device, configured to push the camera module outside the frame and then release the camera module in response to a first control indication, and to catch the camera module and then pull in the camera module inside the frame in response to a second control indication,
wherein in response to the first control indication, the driving device pushes the camera module outside the frame and then releases the camera module, and the motor is enabled to drive the connecting rod to rotate the camera module from the initial position to the preset position for photographing; and
in response to the second control indication, the motor is enabled to drive the connecting rod to rotate the camera module from the preset position to the initial position, then the driving device catches the camera module and pulls the camera module inside the frame.

12. The electronic device of claim 11, wherein the driving device comprises:
a first plate connected to the camera module;
a first electromagnetic component facing towards the first plate and configured to generate or eliminate electromagnetic force between the first electromagnetic component and the first plate;
a second plate configured to be fixedly connected to the frame of the electronic device;
a second electromagnetic component connected on a side of the first electromagnetic component far away from the first plate, and configured to generate or eliminate electromagnetic force between the second electromagnetic component and the second plate; and
an elastic component connected between the second plate and the second electromagnetic component.

13. The electronic device of claim 12, wherein
in response to the first control indication:
the second electromagnetic component is disabled, electromagnetic force is eliminated between the second electromagnetic component and the second plate, the elastic component pushes the first plate, the first electromagnetic component, and the second electromagnetic component to move away from the second plate such that the second plate is separated from the second electromagnetic component, and the camera module is pushed out of the frame; and
the first electromagnetic component is disabled, electromagnetic force is eliminated between the first electromagnetic component and the first plate, and the first plate is separated from the first electromagnetic component; and
in response to the second control indication:
the second electromagnetic component is disabled, the first electromagnetic component is enabled, electromagnetic force is generated between the first electromagnetic component and the first plate, the first plate is fixed with the first electromagnetic component by the electromagnetic force, and the camera module is capable of moving together with the first electromagnetic component; and
the second electromagnetic component is enabled, electromagnetic force is generated between the second electromagnetic component and the second plate, the first plate, the first electromagnetic component, and the second electromagnetic component are driven to move towards the second plate, such that the second plate is fixed with the second electromagnetic component by the electromagnetic force, and the camera module is pulled inside the frame.

14. The electronic device of claim 13, wherein when the second electromagnetic component is enabled, the elastic component is compressed by the second electromagnetic component.

15. The electronic device of claim 12, wherein the first plate has an annular configuration, and surrounds a photographing surface of the camera module.

16. The electronic device of claim 11, wherein the first electromagnetic component and the second electromagnetic component are slidably connected to the slide rail such that the first electromagnetic component and the second electromagnetic component are capable of moving along the slide rail.

* * * * *